(12) United States Patent
Vyvoda

(10) Patent No.: US 6,845,894 B1
(45) Date of Patent: Jan. 25, 2005

(54) SIDE UTILITY RACK KIT FOR TRUCKS

(76) Inventor: Frank Vyvoda, P.O. Box 23071, Honolulu, HI (US) 96822

( * ) Notice: Subject to any disclaimer, the term of this patent is extended or adjusted under 35 U.S.C. 154(b) by 0 days.

(21) Appl. No.: 10/657,564

(22) Filed: Sep. 9, 2003

(51) Int. Cl.$^7$ ................................................ B60R 9/02
(52) U.S. Cl. ........................ 224/405; 224/531; 224/560; 224/561
(58) Field of Search ................................ 224/405, 492, 224/511, 531, 532, 560, 561; 280/769

(56) References Cited

U.S. PATENT DOCUMENTS

| | | | |
|---|---|---|---|
| 2,919,811 A | | 1/1960 | Schodorf, Sr. |
| 4,007,864 A | * | 2/1977 | Hreha .......................... 224/560 |
| 4,278,175 A | | 7/1981 | Jackson |
| 4,607,773 A | * | 8/1986 | Mason ......................... 224/561 |
| 4,944,434 A | * | 7/1990 | Hamilton ..................... 224/560 |
| 4,989,768 A | * | 2/1991 | McNulty ...................... 224/405 |
| 5,108,141 A | * | 4/1992 | Anderson ..................... 224/405 |
| 5,190,337 A | * | 3/1993 | McDaniel .................... 224/405 |
| 5,255,951 A | * | 10/1993 | Moore, III .................... 224/405 |
| 5,350,095 A | * | 9/1994 | Stevens ........................ 224/405 |
| 5,634,681 A | * | 6/1997 | Gionta ......................... 224/405 |
| 6,068,136 A | | 5/2000 | Cole |
| 6,126,053 A | * | 10/2000 | Shaver ......................... 224/532 |
| 6,193,123 B1 | * | 2/2001 | Adamczewski et al. ..... 224/405 |
| 6,450,379 B1 | * | 9/2002 | Cook ........................... 224/405 |
| 6,513,849 B2 | * | 2/2003 | Carter .......................... 224/405 |

* cited by examiner

Primary Examiner—Gary E. Elkins
(74) Attorney, Agent, or Firm—Richard C. Litman

(57) ABSTRACT

A side utility rack and rack kit for trucks having a pipe carrying rack or similar bed-mounted racks employs an assortment of brackets useful with conventional pipe cut in desired lengths in construction. The side utility rack is hung by means of hook brackets from a tubular member of the pipe rack and rests against the truck bed wall at a lower end inner bracket having a rubber bumper to avoid damage to the truck bed. The rack forms forward and rear cages separated by a lengthwise pipe member. The cages accept large, flat objects such as drywall panels or plywood supporting them for safe transportation. The cages may be adjusted in spacing to fit a particular truck and rack and for carrying particular lengths of flat cargo. The rack may be differently configured to fit differing racks associated with pickup or utility trucks.

20 Claims, 8 Drawing Sheets

US 6,845,894 B1

SIDE UTILITY RACK KIT FOR TRUCKS

BACKGROUND OF THE INVENTION

1. Field of the Invention

The present invention relates to vehicle-mounted racks. More particularly, the present invention relates to side-mounted utility racks for carrying large planar items such as drywall or plywood.

2. Description of the Related Art

Pipe carrying racks are commonly mounted on pickup or other utility trucks for carrying pipes and other elongated items such as ladders. These racks are commonly constructed of tubular elements, themselves, such as pipes connected by welding or other means and extend to a height above the cab of the truck. It would be desirable to provide added cargo carrying capacity for outsized material such as drywall sheets or plywood which may be used at the same job site as the pipes, ladder, or other elongated items carried on the top of the pipe rack. It would also be desirable to provide a kit containing an assortment of brackets which, when applied to conventional pipe stock of desired lengths, forms a rack useful for carrying drywall sheets which may be removably mounted on or hung from the pipe rack upper lengthwise tubular element and hang therefrom along the side of the truck.

U.S. Pat. No. 2,919,811, issued Jan. 5, 1960, to Schodorf, Sr., describes a rack that is mounted on the side of a truck and is capable of carrying a large, flat object.

U.S. Pat. No. 4,278,175, issued Jul. 14, 1981, to Jackson, describes a rack that is hung along the side of a truck suspended from an upper, lengthwise tubular member of a pipe rack.

U.S. Pat. No. 6,068,136, issued May 30, 2000, to Cole describes a portable bracket assembly that is mounted on the side of a van to carry a large flat item.

None of the above inventions and patents, taken either singly or in combination, is seen to describe the instant invention as claimed. Thus a side utility rack kit for trucks solving the aforementioned problems is desired.

SUMMARY OF THE INVENTION

The side utility rack and rack kit for trucks having a pipe carrying rack or similar bed mounted racks of the present invention employs an assortment of brackets useful with conventional pipe cut in desired lengths in the rack construction. The inventive side utility rack is hung by means of hook brackets from an upper lengthwise tubular member of the pipe rack and rests against the outer wall of the truck bed at a lower end inner bracket having a rubber bumper between the bracket and the wall to avoid damage to the truck bed. The side utility rack forms forward and rear cages having a lengthwise pipe member separating the cages. The cages accept large, planar or flat objects such as conventional drywall panels so as to support them on their lower side for safe transportation by the truck. The cages may be adjusted in spacing to fit a particular truck and rack and for carrying particular lengths of flat cargo. The rack may be differently configured to fit differing racks associated with pickup or utility trucks. The inventive rack enables a contractor to carry drywall as well as pipe and other building materials and tools to a building site.

Accordingly, it is a principal object of the invention to provide a vehicle side-mounted rack for carrying large, flat or planar items such as drywall.

It is another object of the invention to provide a rack as above which is suspended from the lengthwise tubular member of a pipe rack as mounted on a vehicle.

It is a further object of the invention to provide a rack as above which may easily be hung in place for use and easily removed from the pipe rack as desired.

Still another object of the invention is to provide a variety of brackets comprising a kit which, when mounted on lengths of conventional pipe, forms the bracket as above.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a side utility rack and rack kit for trucks having a pipe carrying rack or similar bed mounted racks of the present invention employs an assortment of brackets useful with conventional pipe cut in desired lengths in the rack construction. The inventive side utility rack is hung by means of hook brackets from an upper lengthwise tubular member of the pipe rack and rests against the outer wall of the truck bed at a lower end inner bracket having a rubber bumper between the bracket and the wall to avoid damage to the truck bed. The side utility rack forms forward and rear cages having a lengthwise pipe member separating the cages. The cages accept large, planar or flat objects such as conventional drywall or plywood panels so as to support them on their lower side for safe transportation by the truck. The cages may be adjusted in spacing to fit a particular truck and rack and for carrying particular lengths of flat cargo. The rack may be differently configured to fit differing racks associated with pickup or utility trucks.

Figure 1:
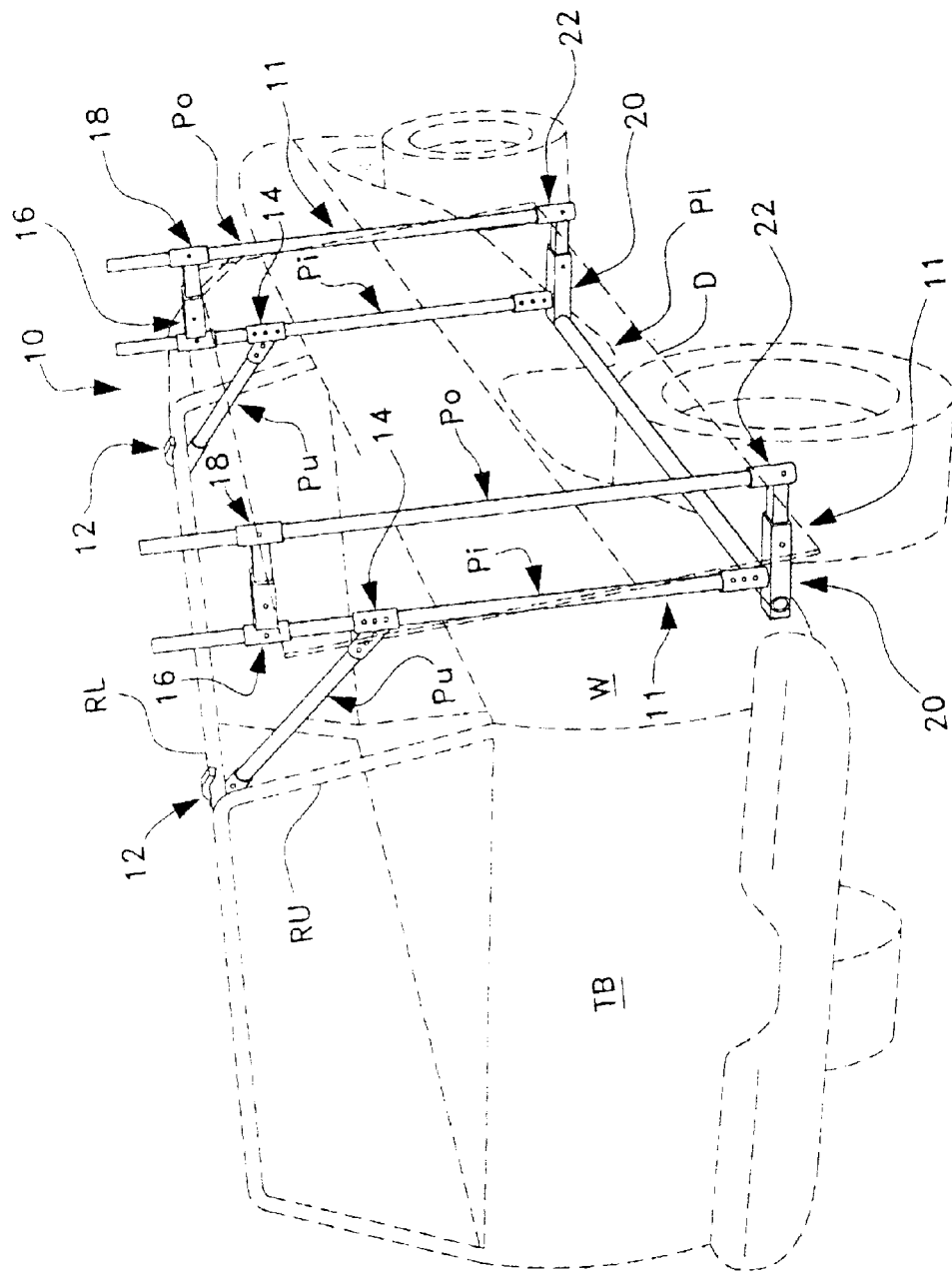
FIG. 1 is an environmental, perspective view of a side utility rack of the present invention as mounted on a truck having a conventional pipe rack.

Referring to FIG. 1, truck side utility rack 10 includes front and rear cages 11, each having a hook bracket 12 and an attachment bracket 14 connected by upper connecting pipe Pu for hanging and securing front and rear cages 11 to rack length tube RL of the pipe rack as installed on a truck having a bed TB with a wall W.

Each cage 11 has an inner upper bracket 16 and an inner lower bracket 20. Inside pipe Pi extends vertically from inner lower bracket 20, through attachment bracket 14 and through inner upper bracket 16 to a free end. Attachment bracket 14 and inner upper bracket 16 may be attached at any desired point along inner pipe Pi to fit the particular truck bed TB and pipe rack length tube RL and to accommodate a desired size of cargo such as drywall sheet D. Each cage 11 also has an adjustable outer upper bracket 18 and an adjustable outer lower bracket 22. Outside pipe Po extends vertically from outer lower bracket 22 to outer upper bracket 18 to a free end.

Inner upper bracket 16 and adjustable outer upper bracket 18 mutually engage to form an adjustable spacing between the upper portions of inside pipe Pi and outside pipe Po. Inner lower bracket 20 and adjustable outer lower bracket 22 mutually engage to form an adjustable spacing between the lower portions of inside pipe Pi and outside pipe Po. By mutual adjustment of the outer brackets, an adjustable spacing is formed between inner pipe Pi and outer pipe Po, thus forming the cages 11 for surrounding a drywall or plywood panel or the like. The spacing between front and rear cages 11 is adjustable by moving one or both inner lower brackets 20 along inner connecting pipe Pl or installing a replacement pipe of the desired length. The inner side of inner lower brackets 20 each have a bumper installed for protection of the truck wall W.

Figure 3:
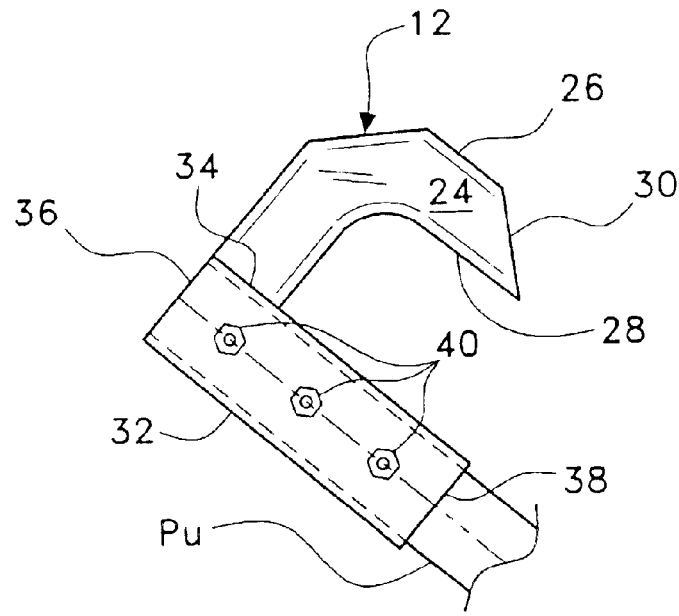
FIG. 3 is a detail view of a hook bracket of FIG. 1.

Referring to FIG. 3, there is shown a detail view of hook bracket 12 having a hook shaped flat 24 having an outer edge 26, an inner edge 28, and a free end 30. Hook bracket 12 is preferably constructed of flat steel or other metal of desired thickness. Hook bracket 12 is attached to hook bracket cylindrical sleeve connector 32 which is tubular in shape and of such a size as to fit over upper connecting pipe Pu. Hook flat 24 is radially connected at its attached end 34 to the wall of cylindrical sleeve connector 32 so as to extend downward from upper end 36 of sleeve 32. Upper connecting pipe Pu is removably inserted into sleeve connector 32 through lower end 38 and held in place by a plurality of mounting bolts and nuts 40 of conventional design through matching aligned and equally spaced throughbores (not shown) of an appropriate diameter for receiving the bolts 40.

The effective length of upper connecting pipe Pu may be adjusted by moving hook bracket 12 inward or outward a distance equal to the spacing between throughbores and inserting bolts 40 through available matching bores in sleeve connector 32 and upper connecting pipe Pu. An alternative is to install a substitute a pipe of the appropriate length as Pu. The plate 24 is preferably ¼" thick steel and the sleeve 32 is preferably 1¼" ID steel pipe.

Figure 4:
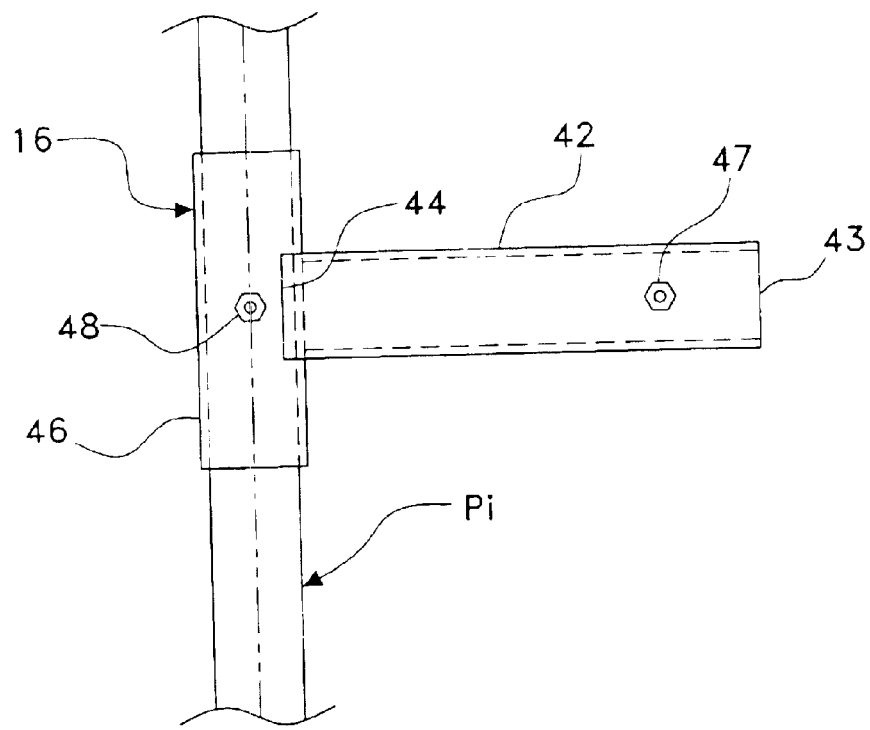
FIG. 4 is a detail view of an upper inner bracket of FIG. 1.

Referring to FIG. 4, there is shown a detail view of generally "T"-shaped inner upper bracket 16 having a horizontally disposed square tube 42 having a free end 43 and attached end 44 attached about midway along the length of vertically extending cylindrical sleeve 46 slidingly fit over the upper portion of inside pipe Pi. Bracket 16 may be adjusted upward or downward by sliding along inside pipe Pi and tightening adjusting screw 48 to secure bracket 16 at a desired elevation. The adjusting screw 48 has a threaded screw fitting through the cylindrical sleeve 48 to bear against inside pipe Pi in a conventional manner, the details not being shown. A similar adjusting screw 47 is located near the free end 43 of square bracket receiving tube 42 so as to adjustably bear against insertion tube 126 of outer upper bracket 18(see FIG. 7). The receiving square tube 42 is preferably 1½" square by ⅛" thick steel tubing and sleeve 48 is 1¼ inch ID steel pipe.

Figure 5:
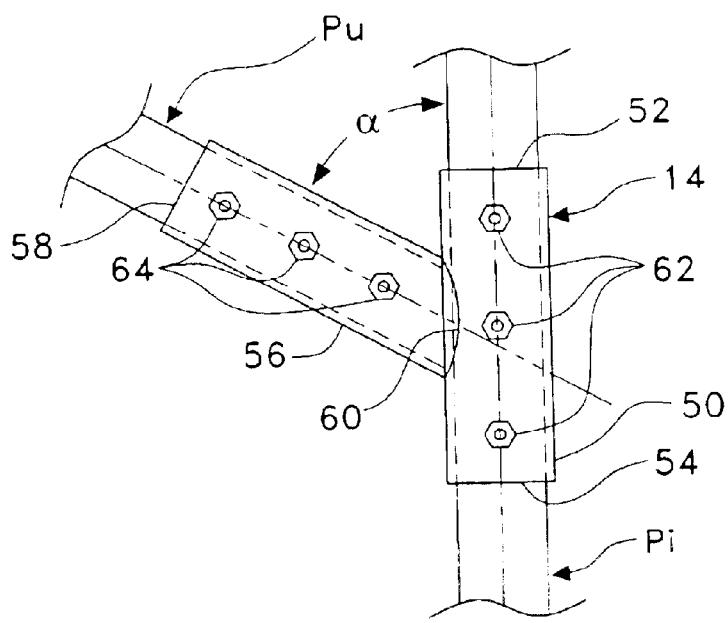
FIG. 5 is a detail view of a pipe rack attachment bracket of FIG. 1.

Referring to FIG. 5, there is shown a detail view of pipe rack attachment bracket 14. Attachment bracket 14 is generally "Y"-shaped and connects upper connecting pipe Pu with inside pipe Pi at a point spaced downward from inner upper bracket 16 and serves to determine the vertical placement of cages 11 of the utility rack 10. Attachment bracket 14 has a vertically oriented mounting sleeve 50 having upper end 52 and lower end 54 and is connected on an inner side with cylindrical sleeve connector 56 at an upper included angle $\alpha$ of preferably 45 degrees, however, other angles may be employed as desired. Cylindrical sleeve connector 56 receives the lower end portion of upper connecting pipe Pu through open end 58 and is connected to mounting sleeve 50 about midway along its length at mounting end 60.

Mounting sleeve 50 is mounted to inside pipe Pi by spaced bolts and nuts 62 through aligned throughbores (not shown) in pipe Pi and mounting sleeve 50. Upper connecting pipe Pu is secured within cylindrical sleeve connector 56 by spaced bolts and nuts 64 through aligned throughbores (not shown) in pipe Pu and cylindrical sleeve connector 56. The bolt connections between bracket 14, upper connecting pipe Pu, and inside pipe Pi are identical to those made between hook bracket 12 an upper connecting pipe Pu, the details of which are conventional and form no part of the invention. The sleeves 50 and 56 are preferably of 1¼" ID steel pipe.

Figure 6A:
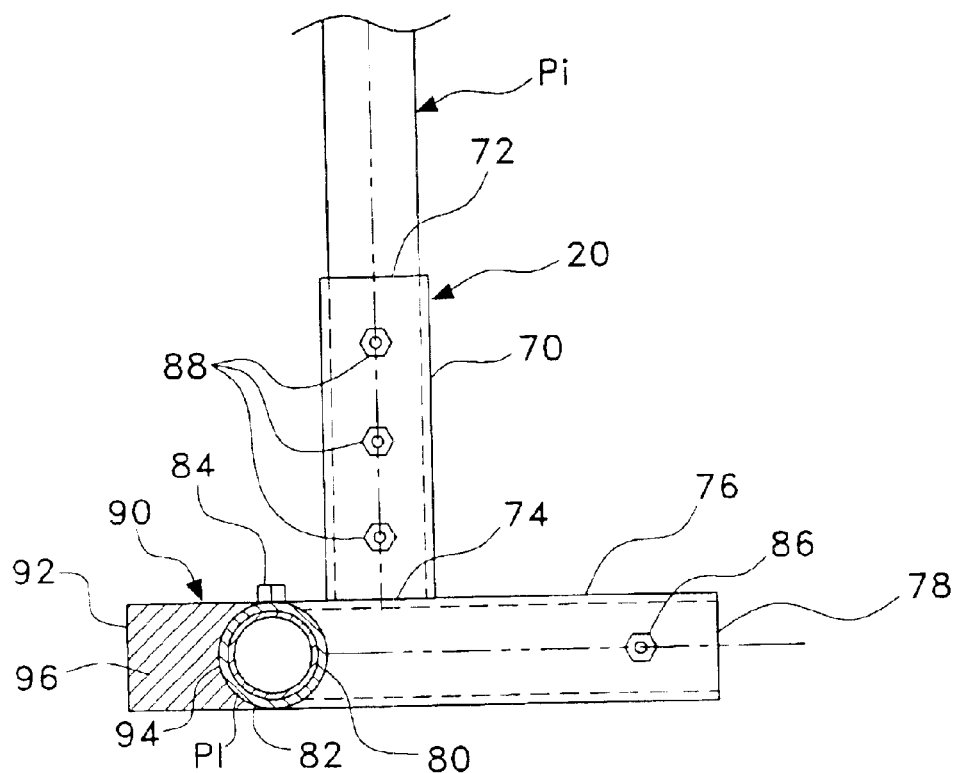
FIG. 6A is a detail elevation view of an inner lower bracket having a bumper.
Figure 6B:
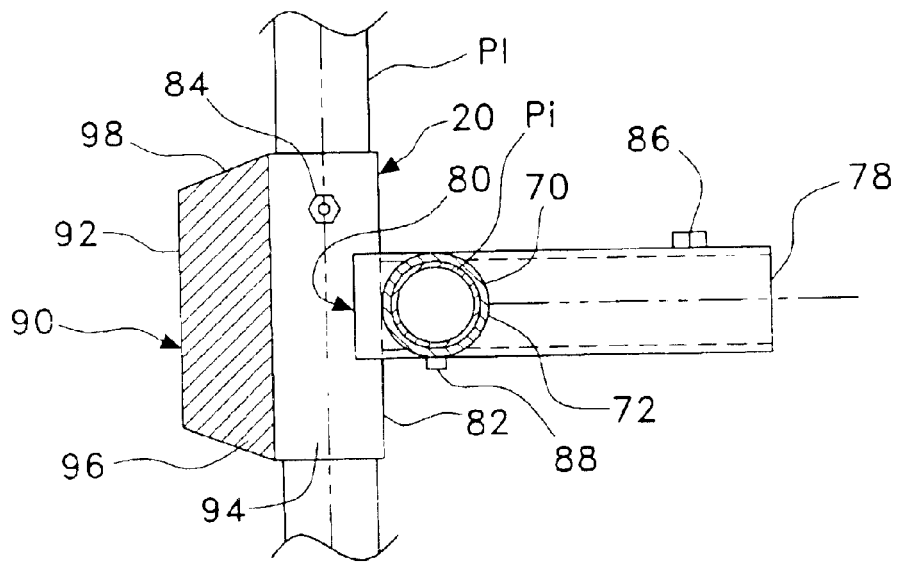
FIG. 6B is a detail plan view of the bracket of FIG. 6A.

Referring to FIGS. 6A and 6B, there is shown a side elevation and a plan view, respectively, of the inner lower bracket and bumper 20. Bracket 20 is generally "L"-shaped and includes a vertically oriented cylindrical connector sleeve 70 having an upper receiving end 72 for receiving the lower end of vertically disposed inside pipe Pi. Cylindrical sleeve 70 is attached at its lower end 74 to the upper surface of square bracket receiver tube 76 extending outward therefrom. Receiver tube 76 has a receiving end 78 for receiving an insertion rod from adjustable lower outer bracket 22(see below). Receiver tube 76 is attached at connection end 80 to pipe sleeve 82 normal to and about midway between its ends.

Pipe sleeve 82 receives lower connecting pipe Pl and adjustably fixes sleeve 82 in place by adjusting screw 84 bearing against connecting pipe Pl in a manner similar to that of adjusting screws previously described in inner upper bracket 16 bearing against inside pipe Pi, above. Inside pipe Pi is secured within cylindrical sleeve connector 70 by spaced mounting bolts mounted through corresponding aligned throughbores in a manner described above as related to attachment bracket 14 such that the spacing between attachment bracket 14 and inner lower bracket 20 becomes fixed. Receiver tube adjusting screw 86 secures the square insert portion of adjustable outer lower bracket 22 as received in square receiver tube 76 in a manner similar to the receiver tube of inner upper bracket 16 receiving the insert tube of adjustable upper outer bracket 18 as described above.

Bumper 90 of rubber or other shock absorbent material has an inner wall 92 bearing against the wall W of the truck, bumper 90 being connected along the inner side of pipe sleeve 82 by adhesive or other means. Bumper 90 has inward tapered endwalls 96 and 98 extending between pipe sleeve 82 and the truck wall W. The sleeves 70 and 82 are preferably 1¼" ID steel pipe and the square tube is 1½" square by ⅛" thick square tubing.

Figure 2:
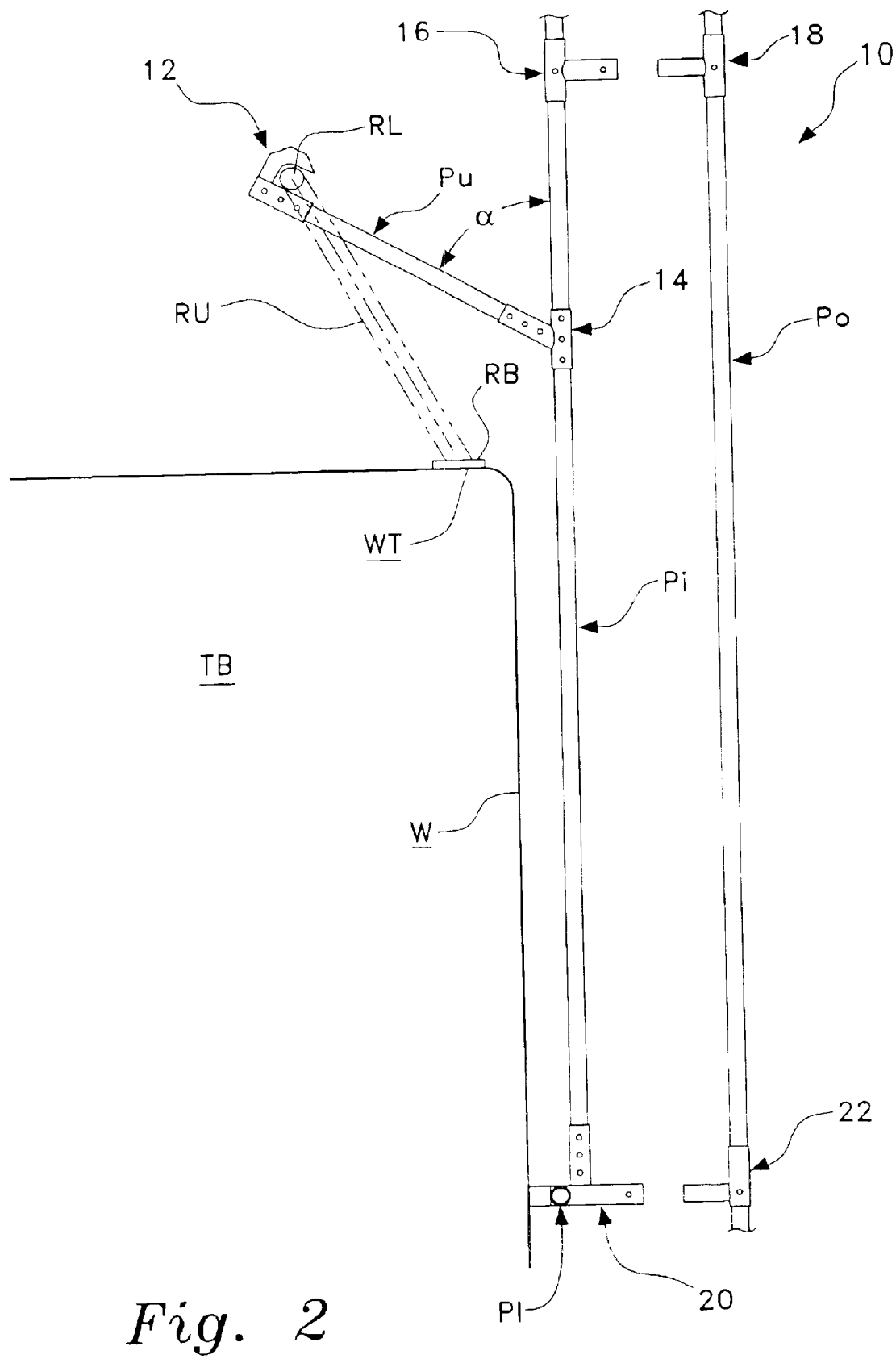
FIG. 2 is a rear elevation view of the invention of FIG. 1 as installed on a truck.
Figure 7:
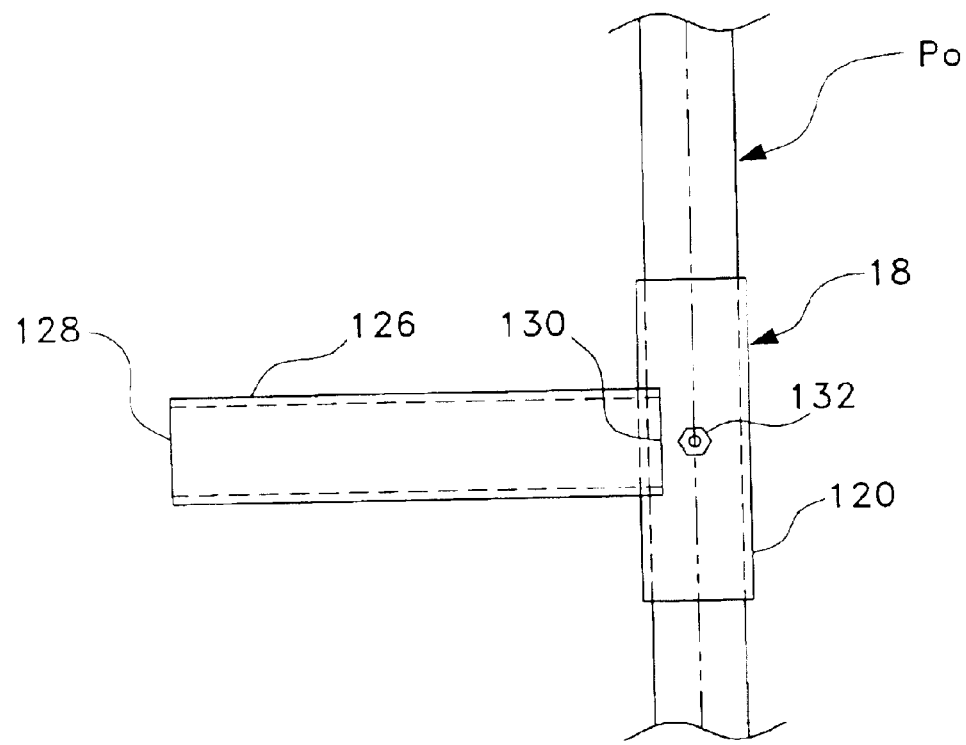
FIG. 7 is a detail view of an adjustable upper outer bracket of FIG. 1.

Referring to FIG. 7, there is shown a detail view of the adjustable upper outer bracket 18. Upper outer bracket 18 is generally "T"-shaped and has a square insert tube 126 having a free insertion end 128 for insertion into insertion receiving tube 42 of inner upper bracket 16(see FIGS. 1 and 2). Insert tube 126 is mounted at its attachment end 130 to outer sleeve 120 at about the midpoint between its upper and lower ends. The upper portion of outside pipe Po is mounted within pipe outer sleeve 120 and secured at a desired position by pipe sleeve adjusting screw 132 bearing against pipe Po in a manner similar to pipe sleeve adjusting screw 84 of inner lower bracket 20 bearing against inside pipe Pi. The tubing 126 is preferably 1¼" square by ⅛" thick steel tubing and the sleeve 120 is 1¼" ID steel pipe.

Figure 8:
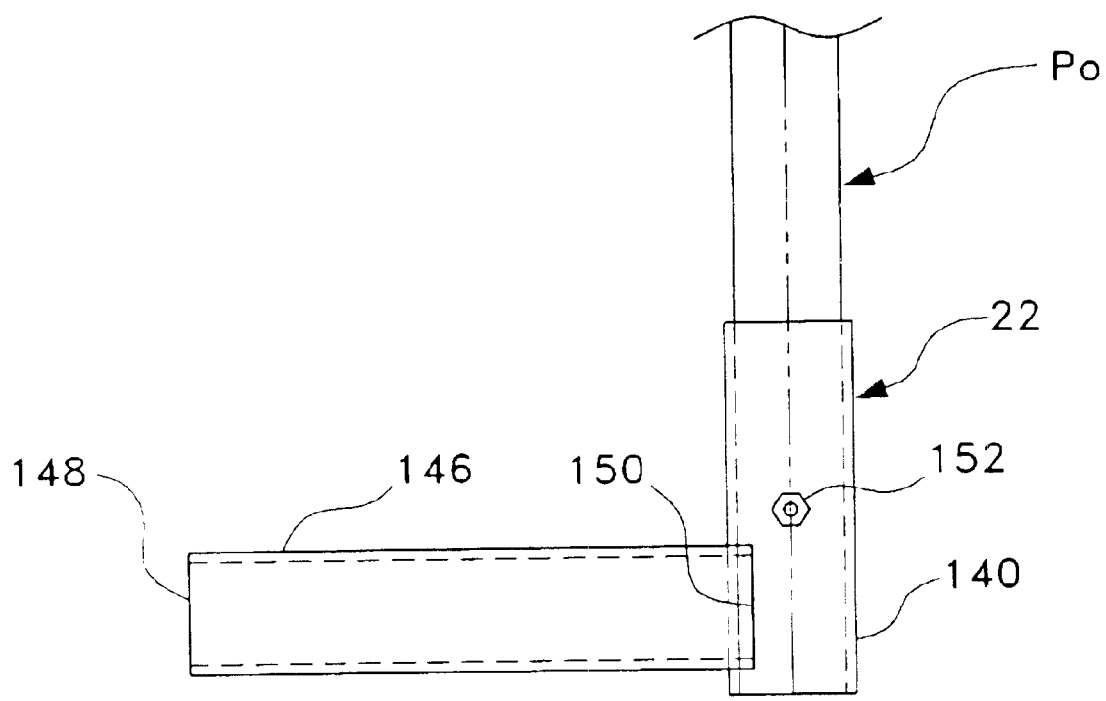
FIG. 8 is a detail view of an adjustable lower outer bracket of FIG. 1.

Referring to FIG. 8, there is shown a detail view of the adjustable lower outer bracket 22. Lower outer bracket 22 is generally "L"-shaped and has a square insert tube 146 having a free insertion end 148 for insertion into insertion receiving tube 76 of inner lower bracket 20(see FIGS. 1 and 2). Insert tube 146 is mounted at its attachment end 150 to outer sleeve 140 at about the midpoint between its upper and lower ends. The upper portion of outside pipe Po is mounted within pipe outer sleeve 140 and secured at a desired position by pipe sleeve adjusting screw 152 bearing against pipe Po in a manner similar to pipe sleeve adjusting screw 84 of inner lower bracket 20 bearing against inside pipe Pi. The tubing 146 is preferably 1¼" square by ⅛" thick steel tubing and the sleeve 140 is 1¼" ID steel pipe.

Figure 9:
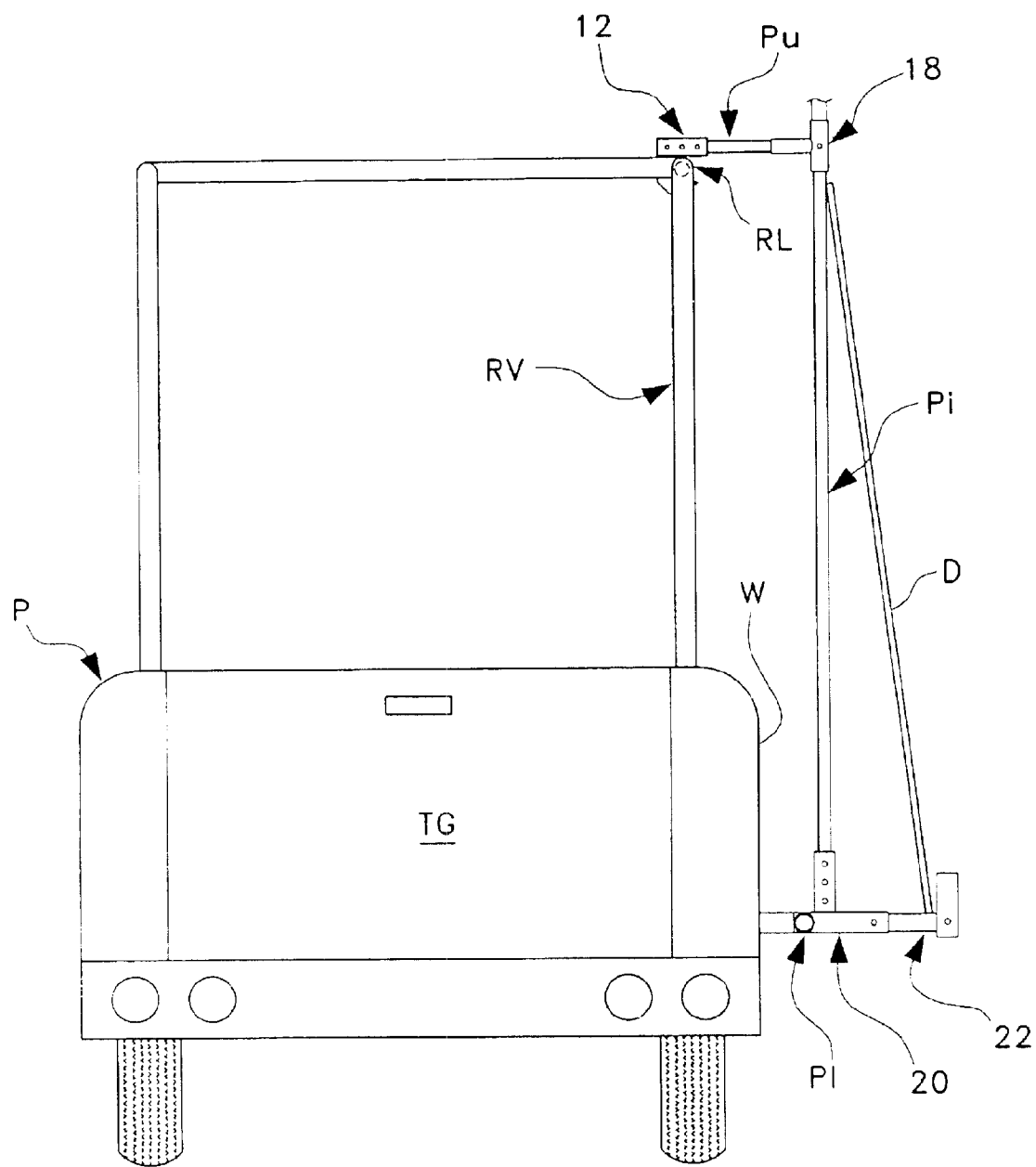
FIG. 9 is an environmental rear elevation view of another embodiment of the inventive rack as installed on a pickup truck.

Referring to FIG. 9, there is shown an environmental rear elevation view of another embodiment of the inventive utility rack and kit applicable to a pickup P having a tailgate TG and a bed wall W and having a pipe rack with rack vertical upright RU and a rack length tube RL. In this embodiment a front or rear support for a flat object such as drywall is formed which does not surround the drywall as in the first embodiment. Pipe rack hook bracket 12 hooks over rack length tube RL such that the upper connecting pipe Pu extends horizontally out from the top of the pipe rack to connect with the insert portion of outer upper bracket 18(see description above). In this embodiment the upper connecting pipe Pu may be a square tube with dimensions which allow its insertion and bolt attachment to hook bracket 12(see description above) and which allow it to fit over the insertion portion of outer upper bracket 18.

Alternatively, the connecting pipe Pu may be a pipe of appropriate length which is inserted and bolt attached within hook bracket 12 and fits within or receives the insertion portion of outer upper bracket 18 and secured therein by an adjusting screw as described above. The inside pipe Pi extends downward through the vertical sleeve of outer upper bracket 18 and ends within the vertical sleeve of lower inner pipe bracket 20 and is bolted in place in the manner of the first embodiment as described above. Lower outer pipe bracket 22 has its insertion portion inserted and secured within the receiving tube of inner lower bracket 20 and secured therein as described above, however no vertical outside pipe Po is employed in this embodiment. The vertical sleeve portion of outer lower bracket 22 extends upward from the insertion tube, forming a right angle corner. The bumper portion of inner lower bracket 22 rests against the wall W.

A front and rear support are provided as described separated by lower connecting pipe Pl as in the first embodiment as described above. The lower side of flat object such as drywall sheet D may be rested in the right angle corner of lower outer bracket 22 and the upper side leaned against the upper portion of the inside pipe Pi for transport. For added security retaining rope may be extended over the drywall between the lower outer bracket 22 and the upper portion of inside pipe Pi and secured in place by tying in a known manner.

Figure 10:
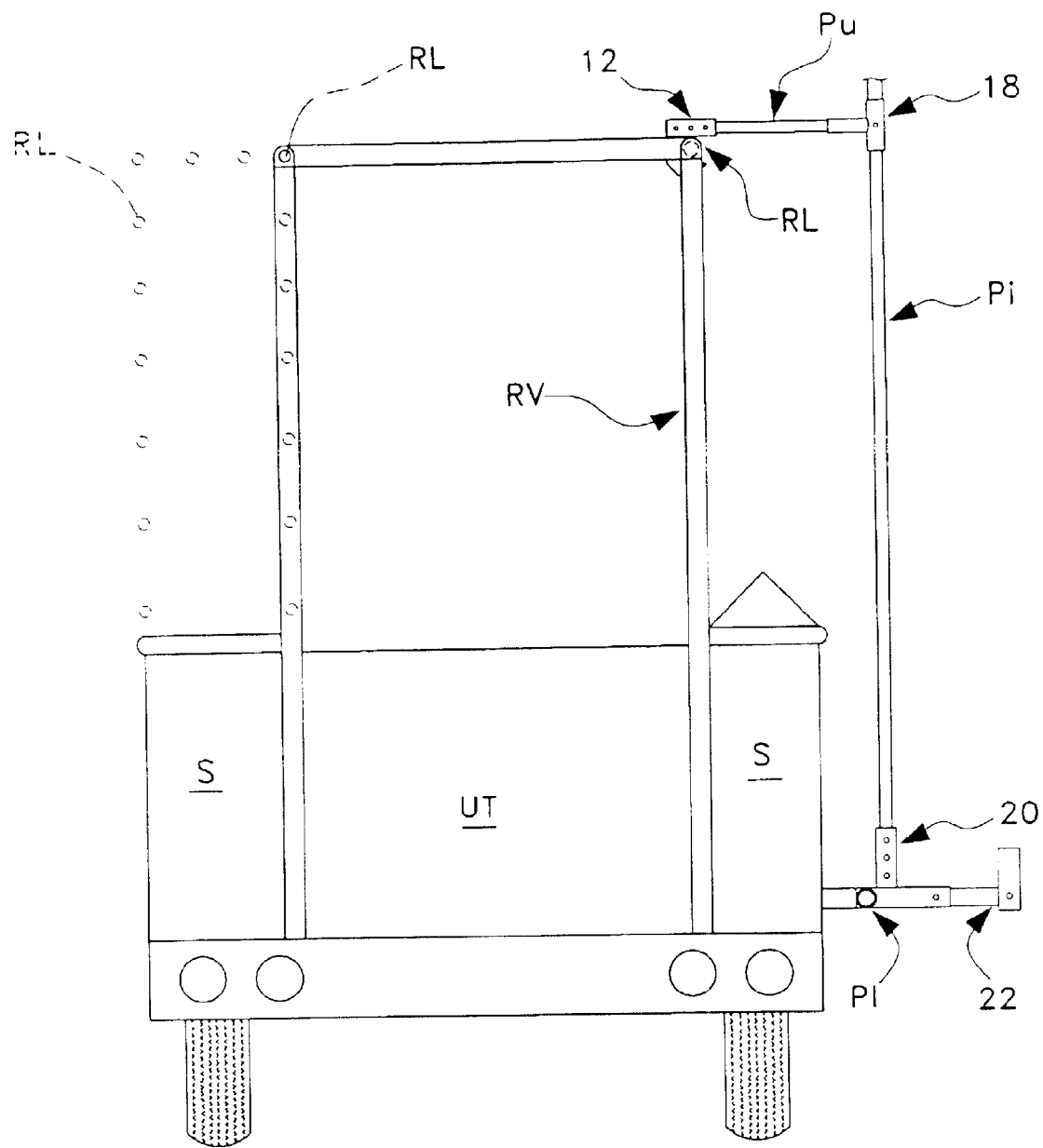
FIG. 10 is an environmental rear elevation view of a variation of the embodiment of FIG. 9 as installed on a utility truck.

Referring to FIG. 10, there is shown a variation of the embodiment of FIG. 9, wherein a utility truck UT is employed having storage boxes S along each wall of the bed. This embodiment is described as above with the exception that a rack vertical tube RV extends from the bed of the utility truck UT to support rack length tube RL and upper connecting pipe Pu is of a greater length to reach over the box S to reach the rack length tube RL. On the opposite side of the truck UT there is illustrated a number of points where support rack length tube RL could be engaged by the hook bracket 12 of the embodiments of side utility rack kit for trucks of the present invention.

The brackets of FIGS. 3–8 are preferably constructed of steel and the parts thereof connected by welding to form the individual brackets. The pipe used for constructing the rack, i.e. Pi, Po, Pu, and Pl are of are 1¼" OD or less so as to fit in the various sleeves of the brackets of the invention and are cut to the desired lengths and drilled to receive the connecting bolts and fit into the various brackets as shown to construct the inventive rack in the desired size to fit the particular truck and cargo for which the rack is used. The pipe is preferably of conventional steel pipe. The constructed rack may be easily modified by adjustment as described above or by substituting appropriate lengths of steel pipe to form the modified rack.

It is to be understood that the present invention is not limited to the embodiments described above, but encompasses any and all embodiments within the scope of the following claims.

I claim:

1. A side utility rack for trucks, comprising:
    front and rear cages each comprising:
        a generally "T"-shaped upper inner bracket having a vertically oriented sleeve and an outward extending receiving tube;
        a generally "T"-shaped upper outer bracket having a vertically oriented sleeve and an inward extending insert tube having dimensions for adjustable insertion within said outward extending receiving tube of said upper inner bracket;
        a generally "L"-shaped lower inner bracket having a vertically oriented connecting sleeve and an outward extending receiving tube;
        a generally "L"-shaped lower outer bracket having a vertically oriented sleeve and an inward extending insert tube having dimensions for adjustable insertion within said outward extending receiving tube of said lower inner bracket;
        a first pipe extending upward from said lower inner bracket and through said upper inner bracket; and
        a second pipe extending upward from said lower outer bracket and through said upper outer bracket;
    a generally "Y"-shaped attachment bracket corresponding to each said front and rear cages and having a vertical connecting sleeve and an inward extending connecting sleeve extending inward and upward from said vertical sleeve at an acute angle; and
    a hook bracket corresponding to each said generally "Y"-shaped attachment bracket having an outward curved hook corresponding to the size of a pipe rack length tube, said hook extending from a connecting sleeve;
    upper pipes extending upward at an angle from said inward extending sleeve of each said generally "Y"-shaped attachment bracket to each said corresponding hook bracket;
    said vertical connecting sleeve of said generally "Y"-shaped bracket being mounted on a corresponding inner vertical pipe of each said front and rear cage and spaced downward from said corresponding upper inner bracket;
    whereby said front and rear cages are suspended from a lengthwise upper tube of a pipe rack by hanging said hook portions of said hook brackets thereover, said upper pipe being of such length and said upward angle of said inward extending connecting sleeves of each said "Y"-shaped brackets that said front and rear cages extend downward along a sidewall of said truck.

2. The side utility rack of claim 1, wherein each said lower inner bracket has a horizontal sleeve and wherein said rack further comprises a lower connecting pipe extending through said lower inner brackets at respective horizontal sleeves, thereby spacing said front and rear cages along the sidewall of the truck.

3. The side utility rack of claim 2, wherein each said lower inner bracket has a bumper on an inner side thereof such as to protect the sidewall of the truck.

4. The side utility rack of claim 3, wherein said inside pipe is adjustably secured relative to said inner upper bracket by an adjusting screw located on said vertical sleeve and said outside pipe is adjustably fixed relative to said upper outer bracket and said lower outer bracket by adjusting screws located on said vertical sleeves thereof.

5. The side utility rack of claim 4, wherein each said insert tube of said outer brackets is adjustably secured within respective receiving tubes of said inner brackets by adjusting screws located on said receiving tubes thereof, thereby fixing the spacing of said inside and outside vertical pipes to form a front and rear cages of a desired width.

6. The side utility rack of claim 5, wherein each said upper pipe is fixed within said corresponding connecting sleeve of said hook bracket at an upper end by through bolts and at a lower end thereof fixed within said inward extending connecting sleeve of said attachment bracket by mounting bolts.

7. The side utility rack of claim 6, wherein each said inside vertical pipe is fixed within said vertical sleeve of said attachment bracket by through bolts and at a lower end thereof fixed within said vertical connecting sleeve of said lower inner bracket by mounting bolts.

8. A kit of brackets for a truck side utility rack comprising:
    at least two generally "T"-shaped upper inner brackets, each having a vertically oriented sleeve and an outward extending receiving tube;
    at least two generally "L"-shaped lower inner brackets, each having a vertically oriented connecting sleeve and an outward extending receiving tube;
    at least two generally "L"-shaped lower outer brackets, each having a vertically oriented sleeve and an inward extending insert tube having dimensions for adjustable insertion within said outward extending receiving tube of said lower inner bracket;
    at least two generally "Y"-shaped attachment brackets, each having a vertical connecting sleeve and an inward extending connecting sleeve extending inward and upward from said vertical sleeve at an acute angle; and
    at least two hook brackets, each having an outward curved hook corresponding to the size of a pipe rack length tube, said hook extending from a connecting sleeve.

9. The kit of brackets of claim 8, further comprising at least two generally "T"-shaped upper outer bracket having a vertically oriented sleeve and an inward extending insert tube having dimensions for adjustable insertion within said outward extending receiving tube of said upper inner bracket.

10. The kit of brackets of claim 9, wherein each said generally "T"-shaped upper inner brackets has a vertically oriented sleeve having an adjustment screw for adjustably locating said upper inner bracket to a vertical pipe extending therethrough, and said outward extending receiving tube is a horizontally disposed square tube having an insertion tube adjusting screw.

11. The kit of brackets of claim 10, wherein each said generally "T"-shaped upper outer brackets has a vertically oriented sleeve having an adjustment screw for adjustably locating said upper outer bracket to a vertical pipe extending therethrough, and said inward extending insertion tube is a horizontally disposed square tube of such dimensions as to fit within said receiving tube of said upper inner bracket and adjustably located by said adjusting screw.

12. The kit of brackets of claim 9, wherein each of said lower inner brackets has a vertically disposed connector sleeve for receiving a vertical pipe and having a plurality of spaced throughbores corresponding with throughbores in said vertical pipe for receiving mounting bolts for fastening said lower inner bracket to said pipe, wherein each of said lower inner brackets has a horizontally disposed sleeve disposed inward of said vertically disposed connecting sleeve, said horizontally disposed sleeve for receiving a horizontal pipe, said horizontally disposed sleeve having an adjusting screw for adjustably locating said lower inner bracket along the horizontal pipe.

13. The kit of brackets of claim 12, wherein each of said lower inner brackets has a bumper located inward of said horizontally disposed sleeve.

14. The kit of brackets of claim 13, wherein each of said lower inner brackets has a square insertion tube extending horizontally outward therefrom, said insertion tube having an adjusting screw.

15. The kit of brackets of claim 14, wherein each of said lower outer brackets has a vertically disposed sleeve having an adjusting screw for receiving a vertical pipe and fastening said vertical pipe within said sleeve by means of said adjusting screw.

16. The kit of brackets of claim 15, wherein each of said lower outer brackets has a horizontally disposed square insertion tube of such dimensions as to fit within said receiving tube of said lower inner bracket and adjustably located by said adjusting screw.

17. The kit of brackets of claim 9, wherein each of said at least two generally "Y"-shaped attachment brackets a vertical connector sleeve for receiving a vertical pipe and having a plurality of spaced throughbores corresponding with throughbores in said vertical pipe for receiving mounting bolts for fastening said attachment bracket to said pipe.

18. The kit of brackets of claim 17, wherein each of said attachment brackets has and an inward extending connecting sleeve extending inward and upward from said vertical sleeve at an acute angle for receiving the lower end of an angled pipe and having a plurality of spaced throughbores corresponding with throughbores in said angled pipe for receiving mounting bolts for fastening said attachment bracket to said pipe.

19. The kit of brackets of claim 18, wherein each of said hook brackets has an a outward and downward extending connecting sleeve at an acute angle for receiving the upper end of said angled pipe and having a plurality of spaced throughbores corresponding with throughbores in said angled pipe for receiving mounting bolts for fastening said hook bracket to said pipe.

20. The kit of brackets of claim 19, wherein each of said hook brackets has a hook flat having an outer upper edge, an inner edge, a free end, and an attachment end extending from an upper end portion of said connecting sleeve in an upward and outward direction so as to hook over a lengthwise tube of a truck pipe rack.

* * * * *